US012449411B2

(12) United States Patent
Gorintin et al.

(10) Patent No.: US 12,449,411 B2
(45) Date of Patent: Oct. 21, 2025

(54) MEASUREMENT DEVICE, IN PARTICULAR FOR DETECTING HYDROGEN IN THE GROUND OF A REGION

(71) Applicant: ENGIE, Courbevoie (FR)

(72) Inventors: Louis Gorintin, Montrouge (FR); Julien Werly, Ermont (FR); Angelique D'Agostino, Ormesson sur Marne (FR)

(73) Assignee: ENGIE, Courbevoie (FR)

( * ) Notice: Subject to any disclaimer, the term of this patent is extended or adjusted under 35 U.S.C. 154(b) by 466 days.

(21) Appl. No.: 17/428,012

(22) PCT Filed: Feb. 4, 2020

(86) PCT No.: PCT/FR2020/050183
§ 371 (c)(1),
(2) Date: Aug. 3, 2021

(87) PCT Pub. No.: WO2020/161431
PCT Pub. Date: Aug. 13, 2020

(65) Prior Publication Data
US 2022/0011288 A1  Jan. 13, 2022

(30) Foreign Application Priority Data
Feb. 5, 2019  (FR) ............................ 1901121

(51) Int. Cl.
G01N 33/24  (2006.01)
G01K 13/00  (2021.01)
G01N 1/24  (2006.01)
H04L 69/323  (2022.01)
H04Q 9/00  (2006.01)

(52) U.S. Cl.
CPC ............ *G01N 33/24* (2013.01); *G01K 13/00* (2013.01); *G01N 1/24* (2013.01); *H04Q 9/00* (2013.01); *H04L 69/323* (2013.01); *H04Q 2209/40* (2013.01)

(58) Field of Classification Search
CPC ...... G01N 33/24; G01N 1/24; G01N 33/0075; G01K 13/00; H04Q 9/00; H04Q 2209/40; H04L 69/323
See application file for complete search history.

(56) References Cited

U.S. PATENT DOCUMENTS

2018/0027515 A1*  1/2018  Tsuji ............... H04L 47/24
                                                    709/232

FOREIGN PATENT DOCUMENTS

EP        2575324 A1    4/2013
WO    2012032306 A1    3/2012

OTHER PUBLICATIONS

Di Martino, Roberto MR, et al. "Continuous monitoring of hydrogen and carbon dioxide at Mt Etna." Chemical geology 357 (2013): 41-51. (Year: 2013).*

(Continued)

*Primary Examiner* — Peter J Macchiarolo
*Assistant Examiner* — Timothy P Graves
(74) *Attorney, Agent, or Firm* — Workman Nydegger (57) ABSTRACT

A detection device, includes: a sensor for detecting a fluid of interest receiving the fluid. The sensor delivers a concentration of the fluid of interest, and a wireless communication module is configured to transmit said concentration of the fluid of interest. An assembly is provided with several devices and a installation with the devices arranged within a region.

24 Claims, 4 Drawing Sheets

(56) References Cited

OTHER PUBLICATIONS

Bithub, Sync Node RTC to network Server[Question} #300, 2017, Gunther (Year: 2017).*
T. Hirata, K. Terada, M. Toyota, Y. Takada, K. Matsumoto and M. S. Tanaka, "Proposal of a power saving network for rice fields using LoRa," 2017 IEEE 6th Global Conference on Consumer Electronics (GCCE), Nagoya, Japan, 2017, pp. 1-4, doi: 10.1109/GCCE.2017.8229298. (Year: 2017).*
Wang, Guoying, et al. "SCFSen: A Sensor Node for Regional Soil Carbon Flux Monitoring." Sensors 18.11 (2018): 3986. (Year: 2018).*
International Search Report and Written Opinion from PCT Application No. PCT/FR2020/050183, Jun. 2, 2020.
French Search Report from corresponding FR Application No. FR1901121, Nov. 18, 2019.
Di Martino et al., "Continuous Monitoring of Hydrogen and Carbon Dioxide at Mt Etna," Chemical Geology, vol. 357 Aug. 20, 2013, pp. 41-51.
Wang et al. "Time Domain Similarity of Lightweight Parameters Based Soil Respiration Sensor Network Deployment," International Journal of Distributed Sensor Networks vol. 11, Article ID 530272, Jun. 15, 2015, 13 pages.
Wang et al. "SCFSen: A Sensor Node for Regional Soil Carbon Flux Monitoring," Sensors, vol. 18, No. 11, Article 3986, Nov. 16, 2018, 19 pages.

* cited by examiner

MEASUREMENT DEVICE, IN PARTICULAR FOR DETECTING HYDROGEN IN THE GROUND OF A REGION

TECHNICAL FIELD

The invention relates to the general field of electronic devices equipped with sensors, for example measurement devices. In particular, the invention concerns electronic devices equipped with sensors configured to detect fluids (liquids/gases) in the ground of a region.

The invention particularly concerns the detection of hydrogen in the ground.

PRIOR ART

The ground of certain regions naturally contains different types of gases, in particular hydrogen. The production of this hydrogen can be related to a ferric reaction of water at high temperature (oxidation of ferrous rock at high temperature and high pressure, which can emit hydrogen), according to one hypothesis.

In any event, it is particularly interesting to determine where underground pockets of hydrogen are in the ground of a region and it has therefore been proposed to do one-time or occasional measurements that give a value of the hydrogen concentration in the ground.

The device referenced GA5000 and sold by the British company Geotech is appropriate for this type of measurement. This device is equipped with a sensor that detects the concentration of hydrogen in gases. To use this device, an operator drills the ground to install a sampling cane to which this device is connected. The operator can read the hydrogen concentration on the device.

This solution is not satisfactory since it requires the presence of an operator to read the data on the device. It is also not possible to measure the evolution of the hydrogen concentration over long periods (from several days to several months).

It is also particularly tricky, with this known device, to obtain a two-dimensional map of the hydrogen concentration in the ground of a region: this requires the presence of an operator at each measurement point.

Although the GA5000 device allows having one-time or occasional information on the quantity of hydrogen present in the ground, qualitative methods have also been proposed. Indeed, it has been observed that some gases impede plant growth: circular areas with no vegetation can thus be observed (typically with a diameter of several hundred meters).

For example, this can be implemented as follows:
- at short distance: with the naked eye, an operator can observe the ground and vegetation of an area;
- at medium distance, a drone equipped with a camera can facilitate the detection of circular areas with no vegetation;
- at long distance, circular structures of 500 to 1000 meters diameter can be detected by satellite images, by focusing on the emission of certain wavelengths.

As can be conceived, the detection of these areas does not provide information on the quantity of gas present in the ground.

Similar methods are based on the use on the ground of spectral cameras to detect the gases in the air (but this method does not work for gases in the ground).

Methods are also known in which seismic vibrations will be measured by a network of communicating sensors, but this solution does not allow detecting the presence of gas produced if this production does not also produce seismic vibrations. The American company Wireless Seismic, Inc. produces such systems.

Existing solutions do not allow easily measuring the concentration of a fluid, typically gaseous hydrogen, in the ground of a region. They make it difficult to create two-dimensional maps on which the concentration of a particular fluid can be read. The same problems are posed for the measurement of other fluid characteristics.

The invention especially seeks to alleviate these disadvantages.

DISCLOSURE OF THE INVENTION

To this end, the invention proposes a measurement device (which can also be called detector), comprising at least:
- a sensor measuring a characteristic of a fluid,
- a wireless communication module configured to transmit the measured characteristic of the fluid.

Thus, the invention makes it possible to automate the collection of information originating from a sensor, since it is equipped with a wireless communication module.

It can be noted that the device may comprise a microcontroller that can store the characteristics measured in an internal or external (non-volatile) memory. This controller can be used to trigger measurement and transmission of the characteristics measured.

According to a particular embodiment, the device comprises a clock, and a sensor control module configured so that the sensor measures the characteristic measured during a predetermined measurement window (for example, at a predetermined time).

This clock can be a component well known to the skilled person: real time clock (RTC) and can be chosen so as to minimize clock drift.

This particular embodiment is advantageous if several devices are used in the same region; the measurements can be synchronized so that they are all implemented in the same measurement window (for example, from the same predetermined time), each device using its own clock for this purpose.

According to a particular embodiment, the device comprises a clock, and a wireless communication module configured to transmit said characteristic measured during a predetermined measurement window (for example, at a predetermined time).

This clock can be similar to the one used to determine said measurement windows, or even the same clock. It can therefore also be a component well known to the skilled person: real time clock (RTC) and can be chosen so as to minimize clock drift.

Optionally, the clock is internal to said microcontroller.

It can be noted that the value of the characteristic measured, for example, can be transmitted regularly by the clock: for example, every hour or every day.

Moreover, the use of the clock makes it possible to choose a transmission window or sending time that will be the listening time of another device, for example a hub.

It can be noted that the measurement window precedes the transmission window, and that each transmission window can be associated with a measurement window.

According to a particular implementation, the wireless communication module is configured to communicate with a hub.

The hub can communicate with several electronic devices such as the one described above. It can especially be able to communicate through a communication network such as the Internet, to make accessible the information read by the electronic devices (the characteristics measured).

If several measurement devices equipped with clocks are used, then they can all transmit their respective measured characteristics at transmission windows or times that are all different. Thus, there are no collisions among the messages sent by different measurement devices. This makes it unnecessary for the hub to be continuously in the listening state, and thus it consumes less power, which improves its power supply life.

The use of wireless connections with low power consumption using version 1.1 of the LoRaWAN protocol, or one of the protocols usable on the "low-power wide area network" (LPWAN) dedicated to the Internet of Things allows devices to consume very little energy and therefore be supplied with only one power supply module such as a battery or even by photovoltaic panels.

According to a particular embodiment, said clock is configured to be synchronized on the basis of a message transmitted by the hub and received by the wireless communication module (of the measurement device).

For example, the message can contain the current time of the hub.

This particular embodiment is particularly useful when several measurement devices are used: they are thus all synchronized to the hub clock which sends them all its current time in a message.

According to another embodiment, during the first communication between the measurement device and the hub, the hub can transmit said message to the device. This transmission can occur when the hub identifies the device.

Also, the message transmitted by the hub can be a clock drift correction message.

According to a particular embodiment, the devices comprise a clock that is configured to transmit, with said characteristic measured, a transmission instant (typically a time of day) of the characteristic measured (for example determined by means of the clock).

This clock can be similar to the one used to determine said measurement windows or said transmission windows, or even the same clock.

On the basis of the transmission time of the characteristic measured, the hub can determine a clock drift of the device relative to its own clock and trigger the transmission of a drift correction message to the device.

Thus, according to a particular embodiment, the device is configured to correct its clock drift on the basis of a message transmitted by the hub (typically, it contains a positive or negative duration).

According to a particular embodiment, the device comprises:
- a tubular sampling cane equipped with one or more orifices passing through the wall of the tubular cane, said one or more orifices being placed in the vicinity of one end of the tubular cane intended to be inserted in the ground, and a pump to suck the fluid present in the ground through the orifice(s) and said tubular cane, the fluid sucked up being received by the sensor.

Thus, this particular embodiment is particularly well suited to the detection of gases produced in the ground of a region. The sensor receives the fluid aspirated by the pump to measure the characteristic.

According to a particular embodiment, the cane has a length greater than 10 or 70 centimeters, and less than 1, 3 or 10 meters.

The inventors of the present invention have observed that good results are obtained with a cane having a length comprised between 70 centimeters and 1 meter. The length of the cane is measured between the end intended to be inserted and its end that can be connected to the pump.

According to a particular embodiment, the cane also comprises between 10 and 100 orifices passing through the wall of the cane.

In particular, the skilled person can choose a number of orifices capable of letting pass a maximum flow rate of 500 milliliters per minute (for example), while minimising the pressure loss.

According to a particular embodiment, the orifice(s) have a diameter comprised between 1 and 3 millimeters, for example 2 millimeters.

According to a particular embodiment, the orifices are separated from each other by a distance between 1 and 3 millimeters, for example 2 millimeters.

According to a particular embodiment, the orifice(s) are arranged in a portion of the cane extending from the end intended to be inserted in the ground along the entire length of the cane or over a length comprised between 3 millimeters and 20 centimeters.

These particular three preceding embodiments make it possible to measure the characteristic of the fluid at one very precise point of the ground of the region.

When the orifice(s) are arranged in a portion of the cane extending from said end intended to be inserted in the ground over a length comprised between 3 millimeters and 20 centimeters. The characteristic is measured at one point or at an even more precise location.

According to a particular embodiment, the device comprises an additional communication module configured to provide a control interface to the user.

For example, this additional communication module can comprise a wired interface or a Bluetooth type wireless interface. This will allow an operator to identify the device (for example by means of an identifier) and control this device. This is particularly useful during installation of the device.

According to a particular embodiment, the device comprises liquid-tight filters permeable to gas arranged on either side of said sensor.

For example, these liquid-tight and gas-permeable filters can comprise polytetrafluoroethylene (better known by the acronym PTFE). The use of these filters is particularly suited to measure the characteristics of fluids in the gas form, and they protect the sensor.

According to a particular embodiment, the sensor measures a concentration of the molecules of interest in the fluid.

According to a particular embodiment, the sensor is configured to detect a concentration of hydrogen in the fluid.

According to a particular embodiment, the wireless communication module is a compatible module and complies with the protocols used in LPWAN communication networks, for example with the LowRaWAN or Sigfox protocol.

According to a particular embodiment, the device comprises an electrical power supply module (preferably portable).

This particular embodiment improves the power supply life of the device. In particular, it is possible to use an electrochemical reserve (for example a battery), or a module with photovoltaic panels associated with a battery, as an electrical power supply module. The skilled person will know to design this source according to the application, i.e., according to the duration of use of the device (for example, one year).

According to a particular embodiment, the device also comprises a temperature sensor configured to measure the temperature of the fluid (optionally suctioned) and/or a humidity sensor configured to measure the humidity of the fluid (optionally suctioned).

The inventors of the present invention observed that temperature and/or humidity (or hygrometry) have an influence on the sensitivity of the detector with regard to the molecules present in the fluid to be characterized. A prior calibration phase can then be implemented.

The invention also proposes an assembly comprising at least two devices such as defined above. In particular, this assembly can comprise devices according to all the particular embodiments described above.

For example, the assembly can comprise several dozen of said devices, or even a hundred of said devices.

According to a particular embodiment, the assembly also comprises a hub.

This hub can be similar to the one described above.

The invention also proposes a installation comprising, within a region, a plurality of devices such as described above arranged in respective locations of the region (typically all different locations), possibly with their respective tubular canes inserted (at least partially) in the ground of the region. For example, the devices can be arranged in predefined locations of the region, with their canes inserted in the ground.

According to a particular embodiment, the devices are arranged to form an essentially regular grid.

Typically, a grid can be formed with a regular space between the devices. The devices can thus be placed along an outline (for example circular) evenly spaced from one another.

According to a particular embodiment, the devices are equipped with clocks, and a control module for their sensor configured so that the sensors of all the devices measure the measured characteristic of the fluid during a predetermined measurement window (for example at the same time).

According to a particular embodiment, the devices are equipped with clocks, the respective wireless communication modules being configured to transmit said characteristic measured at predetermined transmission windows (or instants) (optionally for measurements implemented in a same measurement window—determined with the clock of each device).

Preferentially, the transmission windows are all different. Alternatively, the transmission windows can overlap, but in this case the frequency bands used for two overlapping transmission windows do not overlap.

This particular embodiment is particularly well suited to the use of wireless connections with lower power consumption (low-power wide-area network (LPWAN) or the use of a LoRaWAN protocol.

According to a particular embodiment, the installation can also comprise a hub.

According to a particular embodiment, the hub is configured to transmit said characteristics measured to a remote server.

For example, this transmission to a remote server can be implemented by means of a satellite link.

The remote server can especially enable users to access the characteristics measured, for example via the internet. Moreover, the remote server can create two-dimensional maps of the characteristics measured in the region.

Indeed, the hub can be configured to communicate with said devices, store the measured characteristics received, and transfer them to a remote server via the Internet, possibly by means of a satellite link.

BRIEF DESCRIPTION OF THE DRAWINGS

Other characteristics and advantages of the present invention will appear from the description below, in reference to the attached drawings which illustrate a non-limiting example of embodiment thereof. In the figures.

DESCRIPTION OF EMBODIMENTS

We will now describe examples of communicating devices that can measure the concentration of hydrogen in the ground and communicate this concentration to a hub.

However, the invention is not at all limited to the detection of hydrogen and applies to other fluids of interest to be investigated.

Indeed, it applies to any characteristic of a fluid measurable by means of a sensor.

Figure 1:
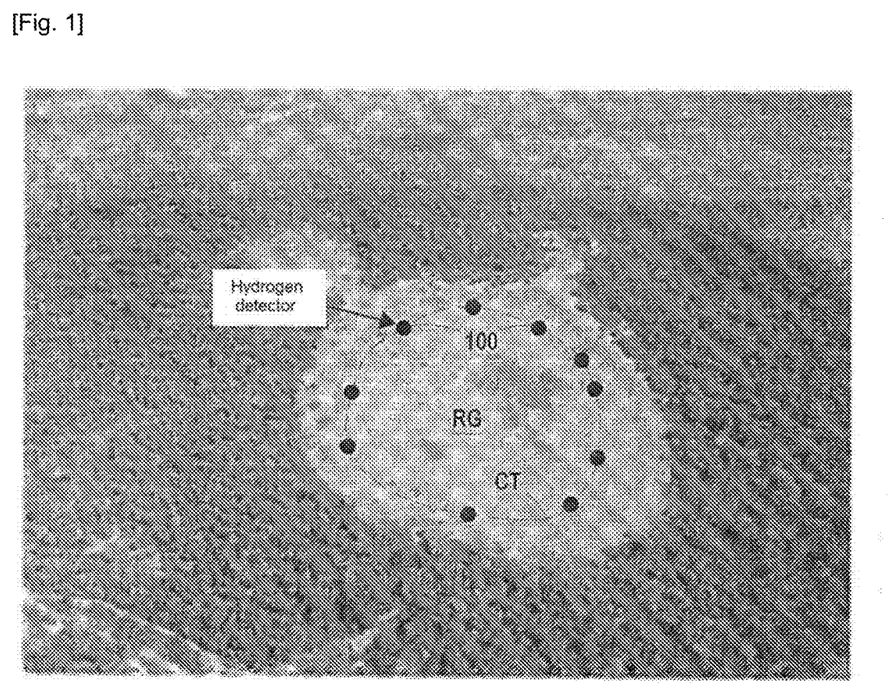
FIG. 1 is a photograph of the area in which the hydrogen produced in the ground impedes the growth of vegetation.

FIG. 1 is a photograph taken from the sky of a region RG having an essentially circular shape and in which an absence of vegetation is observed. It has been observed that such a circular area can result from the underground production of hydrogen.

The invention applies to this type of region. In region RG, a plurality of devices 100 are placed equipped with sensors and canes (because the production of hydrogen is underground here). These devices will be described in more detail in reference to FIGS. 2 and 3.

For circular regions like region RG, the inventors of the present invention observed that the hydrogen concentration is higher in the periphery than at the center of the circular region. As a result, and as shown in the figure, the devices can be placed along an outline CT of an essentially circular shape with the devices all separated from one another (essentially evenly). However, a hub can be positioned, whose operation will be described in more detail in reference to FIG. 5 described below, for example in the center of circular region RG.

By using several devices arranged along outline CT, a two-dimensional map can be obtained, associated with an instant or a time (it can also be called temporal mapping) of the hydrogen concentration, insofar as the sensors are operating simultaneously, as will be described below.

Figure 2:
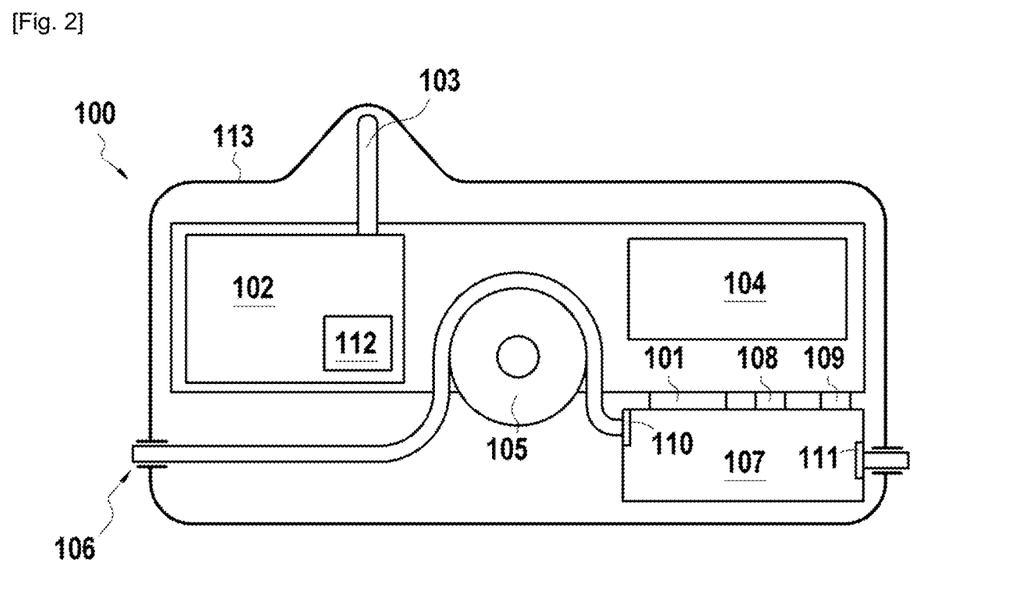
FIG. 2 is a schematic representation of a device according to one example.

In FIG. 2, a device 100 is shown schematically, which can be used in a region RG such as that of FIG. 1. Device 100 comprises a hydrogen sensor 101, for example of the electrochemical type. This sensor can measure a concentration of gaseous hydrogen found in a flow of gas passing before it. The concentration value is measured on the command of an electronic card 102 which comprises a microcontroller, and also a non-volatile memory (internal or external to the microcontroller). The concentration values measured by the sensor can be recorded in this non-volatile memory.

The device is also equipped with an antenna 103 forming a wireless communication module, here according to the LoRaWan protocol version 1.1. The antenna is also controlled by the microcontroller.

For electrical power supply of the various components of device 100, a battery 104 is used, preferably sized so that the device can operate for at least one year.

Figure 3:
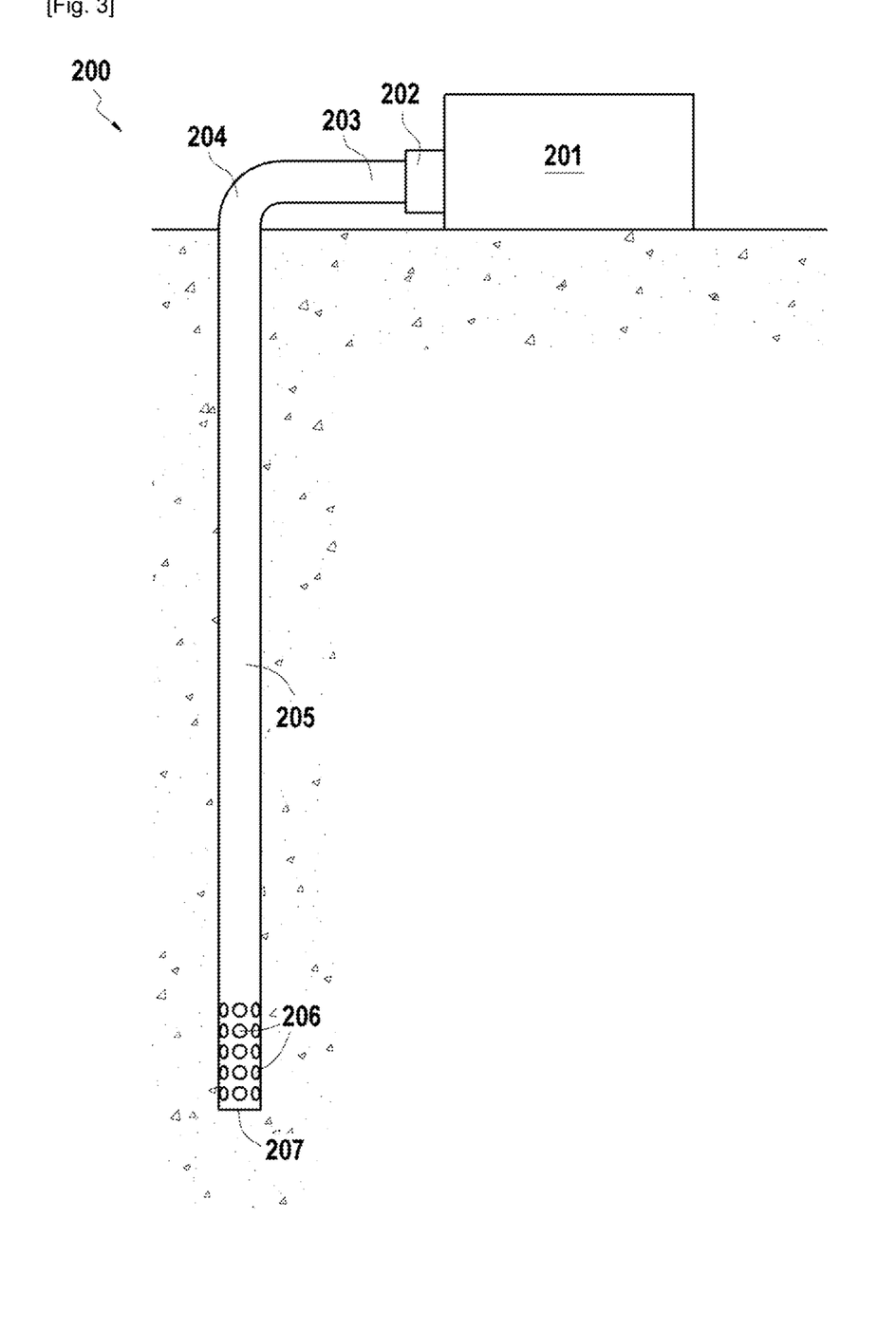
FIG. 3 is a schematic representation of a device provided with a cane according to one example.

A pump 105 is used to bring the fluid to sensor 101, here a membrane or peristaltic pump, typically a pump with an adjustable flow rate (for example from 40 to 500 milliliters per minute). The fluid originates from inlet 106 by a fluidic connection, and this inlet can be left free if hydrogen present on the surface needs to be detected or connected to a cane, as shown in FIG. 3. Pump 105 brings the pumped fluid into a chamber 107 in which sensor 101 has been positioned.

Other sensors are positioned in chamber 107, here a temperature sensor 108 and humidity sensor 109. The inventors observed that temperature and humidity can induce drifts in the hydrogen concentration measured. As a result, these drifts can be corrected by measuring the temperature and humidity (for example within the microcontroller).

So as to protect sensor 101 from fluids that can impede its functioning (typically liquids) and from any contamination, a filter 110 is positioned at the inlet to chamber 107 and a filter 111 is positioned at the outlet of chamber 107. Filters 110 and 111 can comprise PTFE, since this material is liquid-tight and gas permeable.

Sensor 101 is not designed to operate continuously, since this reduces its power supply life and discharges battery 104 too rapidly. To this end, the device is equipped with a clock 112, here arranged in electronic card 102 (optionally, the clock is in the microcontroller). Clock 112 is an RTC component. This clock can trigger the measurement of hydrogen in a predetermined measurement window, for example at the start of every hour. It can also trigger the transmission to the hub of the hydrogen concentration in a predetermined transmission window. Preferentially, the time at which the transmission is done is sent with the concentration, which allows the hub to correct for clock drift.

Finally, device 100 is equipped with a housing 113, for example of plastic, which will protect components 101 to 112.

In FIG. 3, a device 200 is shown comprising a housing 201 which is analogous to housing 113 described in reference to FIG. 2. Here, housing 201 comprises a connection 202 by clipping or screwing (for example) for a tube 203 connected thereto. Tube 203 can have a length of around 10 centimeters.

Here, housing 201 is positioned on the ground of a region. Since the concentration of hydrogen in the ground is to be measured, tube 203 is connected by an elbow 204 to a cane 205 which is inserted in the ground at the location where the hydrogen concentration is to be measured.

In the example shown, cane 205 has a length of 80 centimeters. The cane is tubular and its wall comprises through orifices 206. These through orifices are arranged regularly (or not) in the form of a grid, with a space between the orifices of at least 2 millimeters and a diameter of 2 millimeters. Orifices 206 are all arranged in a portion of a cane 205 extending from its end inserted in the ground 207 over 10 centimeters. This ensures that the measurement is properly done at the predetermined location of the ground of the region.

Figure 4:
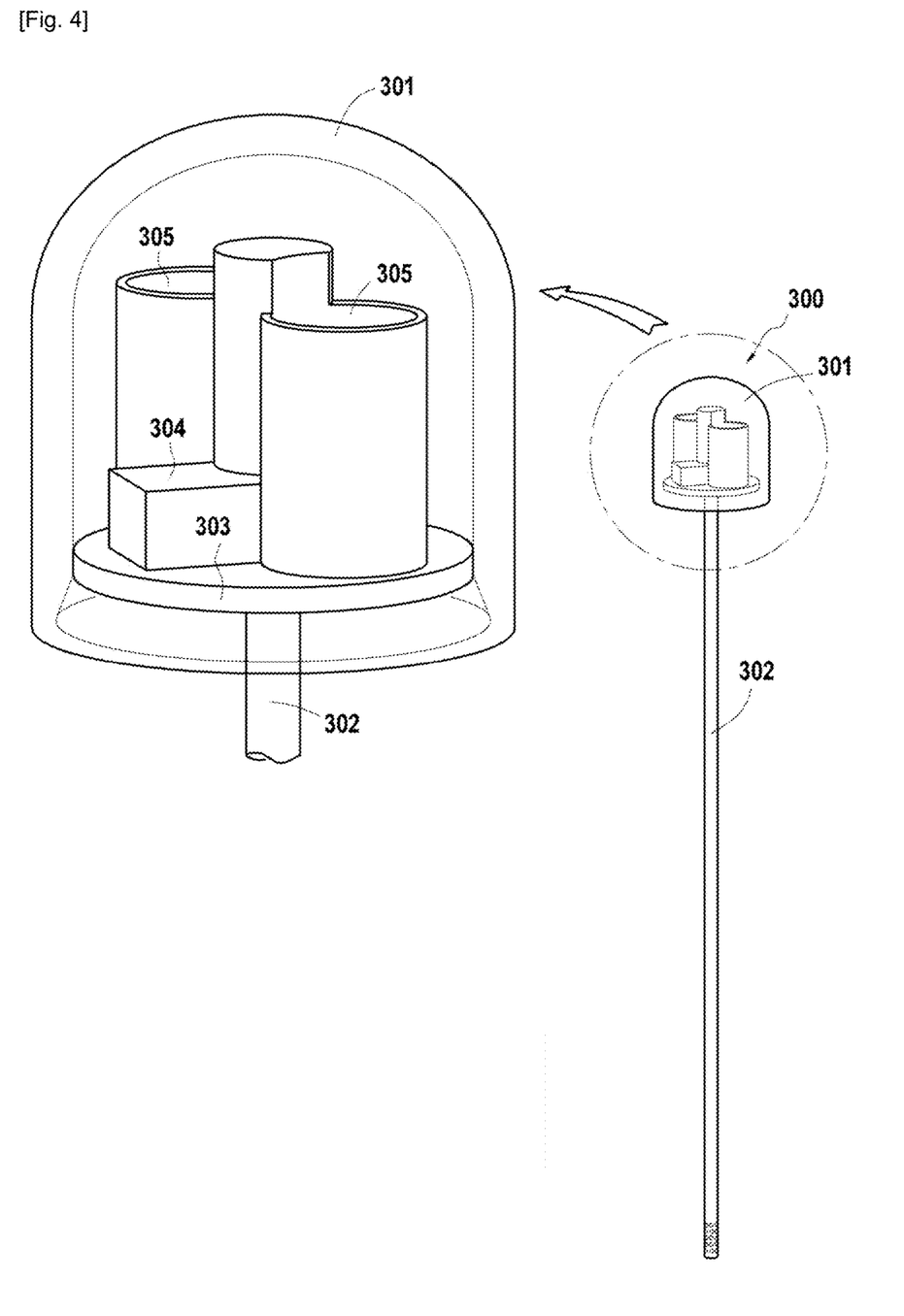
FIG. 4 is a schematic representation of a device provided with a cane according to another example.

FIG. 4 is a variant of the device of FIG. 3. Device 300 of FIG. 4 also comprises a housing 301 designed to be positioned on the ground of a region, but it is placed directly on top of its cane.

In fact, housing 301 comprises a dome comprising a protective material, typically plastic. A lower portion of the housing, located under the dome, can be aluminum to provide good shielding (for example, it can be cylindrical).

Moreover, for its attachment to cane 302, a base 303, for example of aluminum, is arranged at the base of the housing. An O-ring can be used to ensure that the housing is sealed, and the housing can be connected to the base by means of threading or a quarter-turn fastener.

Pump 304 is placed directly on base 303, and two locations 305 are also provided to receive the batteries.

Figure 5:
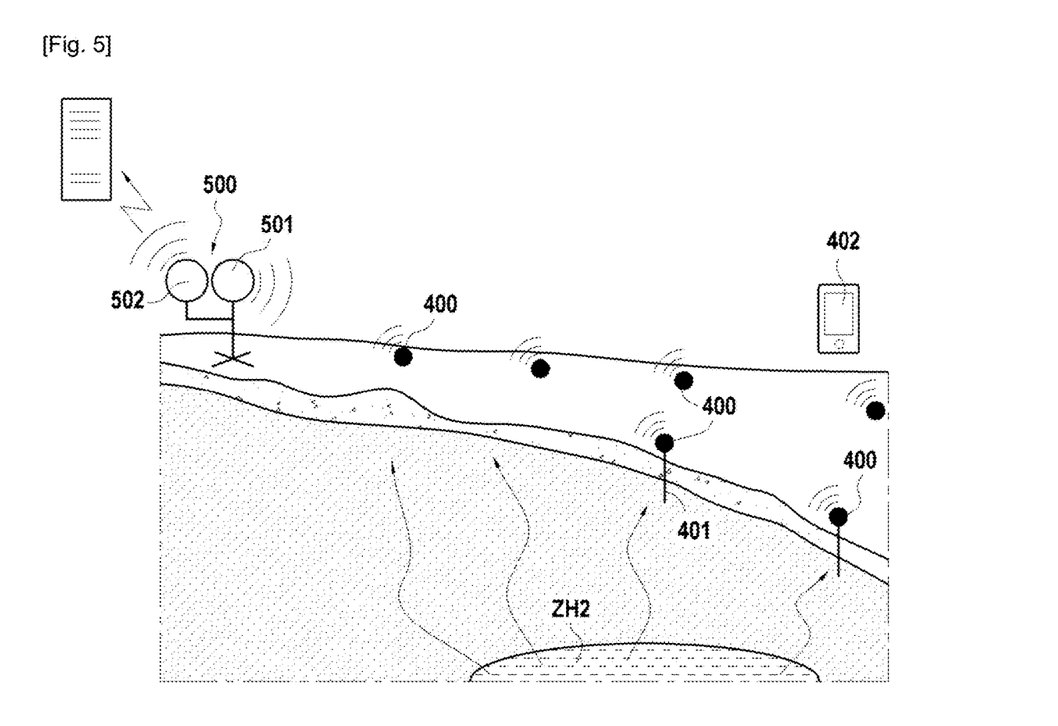
FIG. 5 shows the communication between the devices and a hub.

In FIG. 5, a plurality of devices 400 is shown, for example analogous to devices 200 or 300 described above. Devices 400 are provided with canes 401 inserted in the ground of a region, above an area ZH2 containing hydrogen that can diffuse toward the surface.

Note that devices 400 are all equipped with a Bluetooth communication module. This can allow an operator to use a smartphone or tablet type unit 402 and identify the device (for example by means of an identifier) and control this unit. This is particularly useful during the installation of the unit, but also can implement one-time or occasional readings. For example, when a user of this type of unit communicates with a device 400, optionally after this device 400 has been selected if several devices 400 are detected, information can be read on the screen of unit 402 chosen from among: the identifier of the device, the GPS location of the device (if it is equipped with a GPS module), the voltage value and the charge status of the battery, one or more buttons to select an operating mode of the device (one time/occasional or regular measurement), the flow rate of the pump (optionally, it can be adjusted), the measurement frequency if it is regular, a button to start a measurement, the measurement results, the maximum concentration of hydrogen measured, the hydrogen, temperature and humidity measurement results, with the time of measurements, etc.

Here, devices 400 communicate with a hub 500. This communication is implemented using a LoRaWAN protocol and hub 500 comprises a communication module 501 according to this protocol. It also comprises a clock (not shown here).

During the first communication between each device 400 and hub 500, hub 500 will send, during its first communication with the detector, a message comprising its current time (the one when the message was sent) so that devices 400 are all synchronized.

This synchronization allows the devices to all measure the hydrogen concentration at the same instant, for example at the start of every hour: this allows creating two-dimensional temporal maps of the hydrogen concentration in the region's ground.

Concentration transmissions by devices 400 are preferentially implemented at predetermined and all different times (in particular if a single frequency band is used). As a result, the hub will listen successively at predetermined time windows for the messages coming from the devices. This saves energy and improves hub power supply life.

For example, if three devices are used, the measurement can be done at the start of every hour, since each of the devices in turn will transmit the concentration with their transmission time at predetermined times, for example 15 minutes after the start of the hour, 30 minutes after the start of the hour, and 45 minutes after the start of the hour.

The hub therefore receives the concentrations with the transmission times, so it can compare them with its own clock; alternatively, the hub compares the times or instants the concentrations are received with an expected time for this message.

As a result, the hub can detect a drift in the clock of one of devices 400, then send a drift correction message with the compensation value to be applied. On receipt of this message, devices 400 can correct the drift in their clock.

In this way, improved measurement and transmission synchronization is obtained to ensure that two-dimensional maps showing the hydrogen concentration at an instant are obtained, and to keep the electrical power consumption of the devices and the hub low.

Thus, hub 500 is provided with a module 502 for communication with the Internet. For example, a satellite link or a GSM/GPRS link can be used for this purpose. This makes the hydrogen concentrations measured in the region accessible remotely via a server.

Figure 6:
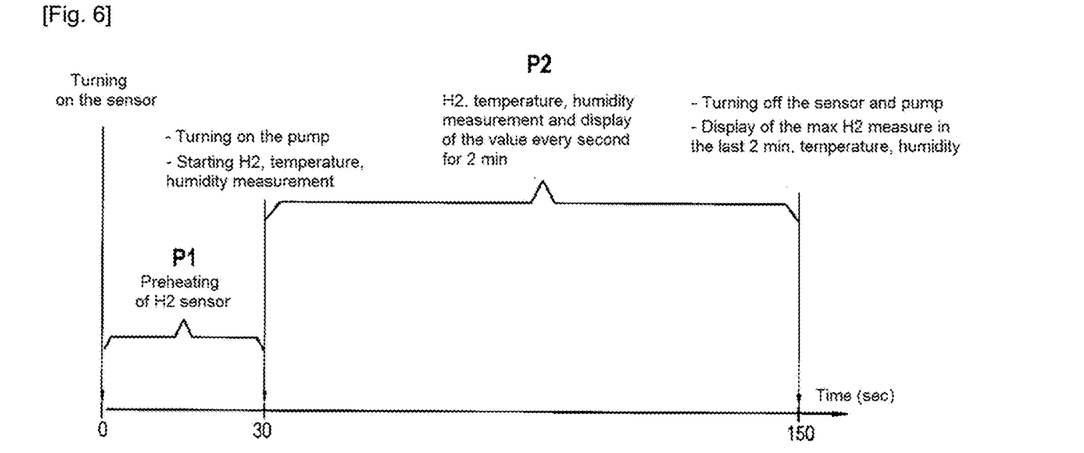
FIG. 6 is a graph that shows the operation of the sensor.

FIG. 6 shows the different phases of a hydrogen measurement, implemented by one of the devices as described above.

These phases are synchronized as explained above so that several devices implement them simultaneously.

In a first phase P1, which starts with turning on the sensor, sensor preheating is implemented. This first phase can last 30 seconds.

Then, during a second phase P2, with a duration of 120 seconds, for example, hydrogen measurements are implemented, for example at the sampling frequency of the sensor. All the measurement results can be sent to the device's microcontroller.

At the end of phase P2, the maximum hydrogen concentration value measured is determined via the microcontroller. This maximum value becomes the value sent to the hub. Before this transmission, it is stored in memory.

Alternatively, the mean value of the measurements can be determined in phase P2, this mean value then becoming the value to transmit to the hub.

Additionally and likewise, the maximum temperature and humidity values can be obtained in phase P2.

Note that in the present application, the expression measurement device can be replaced by detector.

The content of the French patent entitled "Low-consumption hub and detector configured to communicate with this hub" filed on the same day as the present application by the same applicant, is integrally incorporated in the present application by reference.

The invention claimed is:

1. A measurement device, comprising:
a sensor measuring a characteristic of a fluid, and
a wireless communication module configured to transmit the measured characteristic of the fluid,
a clock,
wherein said measurement device is configured to:
measure said characteristic of the fluid, said measurement being triggered by the clock according to a measurement schedule common to a plurality of measurement devices, wherein the measurement device and the plurality of measurement devices all measure the characteristic of the fluid at a same instant, and
transmit, according to a transmission schedule specific to the measurement device, said measured characteristic of the fluid and a corresponding transmission time.

2. The device according to claim 1, comprising a sensor control module configured so that the sensor measures the measured characteristic of the fluid during a predetermined measurement window.

3. The device according to claim 1, comprising a clock, the wireless communication module being configured to transmit said characteristic measured during a predetermined transmission window.

4. The device according to claim 1, wherein the wireless communication module is configured to communicate with a hub.

5. The device according to claim 4, wherein said clock is configured to be synchronized on the basis of a message transmitted by the hub and received by the wireless communication module.

6. The device according to claim 1, comprising: a tubular sampling cane equipped with one or more orifices passing through a wall of the tubular sampling cane, said one or more orifices being placed in the vicinity of one end of the tubular sampling cane intended to be inserted in the ground, and
a pump to suck the fluid present in the ground through the one or more orifices and said tubular sampling cane, the fluid sucked up being received by the sensor.

7. The device according to claim 6, wherein the cane has a length greater than 10 or 70 centimeters, and less than 1, 3 or 10 meters.

8. The device according to claim 6, wherein the cane comprises between 10 and 100 orifices passing through the wall of the cane.

9. The device according to claim 6, wherein the one or more orifices have a diameter comprised between 1 and 3 millimeters, are separated from each other by at least a distance comprised between 1 and 3 millimeters, and are arranged in a portion of the cane extending from said end intended to be inserted in the ground along the entire length of the cane or over a length comprised between 3 millimeters and 20 centimeters.

10. The device according to claim 1, comprising an additional communication module configured to provide a control interface to a user.

11. The device according to claim 1, comprising liquid-tight and gas-permeable filters, arranged on either side of said sensor.

12. The device according to claim 1, wherein the sensor measures a concentration of molecules of interest in the fluid.

13. The device according to claim 1, wherein the sensor is configured to detect a concentration of hydrogen in the fluid.

14. The device according to claim 1, wherein the wireless communication module is a compatible module and complies with protocols used in LPWAN communication networks.

15. The device according to claim 1, comprising a module for electrical power supply.

16. The device according to claim 1, also comprising a temperature sensor configured to measure the temperature of the fluid and/or a humidity sensor configured to measure the humidity of the fluid.

17. An assembly comprising at least two devices according to claim 1.

18. The assembly according to claim 17, also comprising a hub.

19. An installation comprising, within a region, the plurality of measurement devices according to claim 1 in respective locations of the region.

20. The installation according to claim 19, wherein the devices are arranged to form an essentially regular grid.

21. The installation according to claim 19, wherein the devices are equipped a control module for their sensor configured so that the sensors of all the devices measure the measured characteristic of the fluid during a predetermined measurement window.

22. The installation according to 19, wherein the plurality of measurement devices are equipped with clocks, wherein respective wireless communication modules are configured to transmit said characteristic of the fluid measured at predetermined transmission windows.

23. The installation according to claim 19, also comprising a hub.

24. The installation according to claim 23, wherein the hub is configured to transmit said characteristics measured to a remote server.

* * * * *